US012187534B2

(12) United States Patent
Lapoussis et al.

(10) Patent No.: US 12,187,534 B2
(45) Date of Patent: Jan. 7, 2025

(54) HEAVY DUTY GARBAGE BAG SUPPORT

(71) Applicants: George Lapoussis, Wolfe Island (CA); Peter Lapoussis, Whitby (CA)

(72) Inventors: George Lapoussis, Wolfe Island (CA); Peter Lapoussis, Whitby (CA)

( * ) Notice: Subject to any disclaimer, the term of this patent is extended or adjusted under 35 U.S.C. 154(b) by 0 days.

(21) Appl. No.: 18/461,688

(22) Filed: Sep. 6, 2023

(65) Prior Publication Data

US 2023/0415978 A1 Dec. 28, 2023

Related U.S. Application Data

(63) Continuation-in-part of application No. 17/236,863, filed on Apr. 21, 2021, now abandoned.

(51) Int. Cl.
*B65F 1/00* (2006.01)

(52) U.S. Cl.
CPC .................................. *B65F 1/0013* (2013.01)

(58) Field of Classification Search
CPC ... B65F 1/1415; B65F 1/0013; B65B 67/1238
USPC .................. 248/99, 100, 101, 95, 96, 97, 98
See application file for complete search history.

(56) References Cited

U.S. PATENT DOCUMENTS 760,690 A * 5/1904 Harris ..................... B65B 67/12 248/97
812,307 A * 2/1906 Stearns ................ F16M 13/022 248/100
3,861,630 A * 1/1975 Ady ...................... B65B 67/125 248/101
4,223,858 A * 9/1980 de Salazar .............. B65B 67/12 248/101
4,669,690 A * 6/1987 McEniry ............... B65F 1/1442 248/101
4,832,291 A * 5/1989 Nelson ................ B65B 67/1238 D34/5
4,951,903 A * 8/1990 Frey .................... B65B 67/1222 248/99
4,998,695 A * 3/1991 Nobis ..................... B65B 67/12 248/101
9,290,194 B1 * 3/2016 Catinchi ............... B65F 1/1415

FOREIGN PATENT DOCUMENTS

CA 2847203 A1 * 9/2015 .............. B65F 1/067
CN 105000296 A * 10/2015 ............ B65F 1/1415

* cited by examiner

*Primary Examiner* — Kimberly T Wood
(74) *Attorney, Agent, or Firm* — Capehart Law Firm

(57) ABSTRACT

An apparatus for supporting a bag, particularly a heavy-duty bag, in an open-position on a support-surface. The apparatus includes a support-frame, a frame-backing, at least one fastener, and in some embodiments, at least one clip. The apparatus may be mounted to any support-surface. The apparatus is particularly useful for supporting a heavy-duty bag on any surface in a warehouse.

16 Claims, 19 Drawing Sheets

HEAVY DUTY GARBAGE BAG SUPPORT

REFERENCE TO PENDING APPLICATIONS

This application claims the benefit of pending application, Ser. No. 17/236,863, filed on Apr. 21, 2021, entitled Heavy Duty Garbage Bag Support.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of garbage bags of existing art and more specifically relates to an apparatus for supporting a garbage bag.

RELATED ART

Public demand for convenience when shopping for products and services is increasing, and as such, retail and wholesale distribution centers are beginning to carry greater quantities and varieties of products. With the increased quantity and variety of products and services, the amount of waste generated at these distribution centers has also increased.

Waste management in these distribution centers and warehouses typically consists of the use of large garbage cans. A problem with this solution is that the garbage cans are not always in a convenient location for a worker, which is further compounded by the size of many warehouses. Due to their size, the garbage cans are not easily moved, and as such, the worker must seek out the garbage can each time, which is unnecessarily time consuming. Alternatively, they may save the garbage for a later trip once their work in a particular area is completed, but this is cumbersome, obstructive and potentially dangerous to leave piles of garbage on the warehouse floor. As such, a suitable solution is desired.

SUMMARY OF THE INVENTION

In view of the foregoing disadvantages inherent in the known trash bag holder art, the present disclosure provides a novel heavy duty garbage bag support. The general purpose of the present disclosure, which will be described subsequently in greater detail, is to provide a means of holding a garbage bag in an open-position, particularly a heavy-duty garbage bag, as used for commercial purposes such as in warehouses, distribution centers, etc.

An apparatus is disclosed herein. The apparatus may be used for supporting a bag in an open-position on a support-surface. The bag may include a heavy-duty load capacity. The open-position may include the bag having an open-mouth and a rim bordering the open-mouth. The apparatus may include a support frame and at least one fastener. The support-frame and the at least one fastener may be structured and arranged such that the apparatus is able to support the bag at its maximum load capacity.

The support-frame may include an at least substantially shatter-resistant material. Further, the support-frame may include a rear-side and a front-side relative to the support-surface. The rear-side may be configured for attachment to the support-surface. The support-frame may define an opening configured to receive the bag therethrough and the support-frame may be configured to support the rim of the bag when the bag is inserted therethrough and hold the bag in the open-position. The at least one fastener may be configured to removably mount the rear-side of the support-frame to the support-surface.

According to another embodiment, a method of using an apparatus is also disclosed herein. The method includes providing the apparatus as above; placing the rear-side of the support-frame against the support-surface; mounting the support-frame to the support-surface via the at least one fastener; inserting the bag through the opening of the support-frame; attaching the rim of the bag to the support-frame such that the support-frame holds the bag in the open-position; filling the load capacity of the bag; and selectively removing the bag from the support-frame when needed.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a heavy-duty garbage bag support, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a garbage bag holder and more particularly to a heavy-duty garbage bag support as used to hold a garbage bag in an open-position on any support surface. Generally disclosed is an industrial warehouse garbage bag support bracket. The garbage bag support bracket may include a bracket, a bracket backing made from aluminum, screws, washers, and bag clips for attaching the garbage bag to the bracket. Particularly, the garbage bag support bracket may be useful for disposal of waste from a forklift truck. As such, the garbage bag support bracket may be made from shatterproof polycarbonate material configured to withstand being repeatedly hit by "flying" garbage (thrown from the forklift truck).

Referring now more specifically to the drawings by numerals of reference, there is shown in FIGS. 1-11, various views of an apparatus 100.

Figure 1:
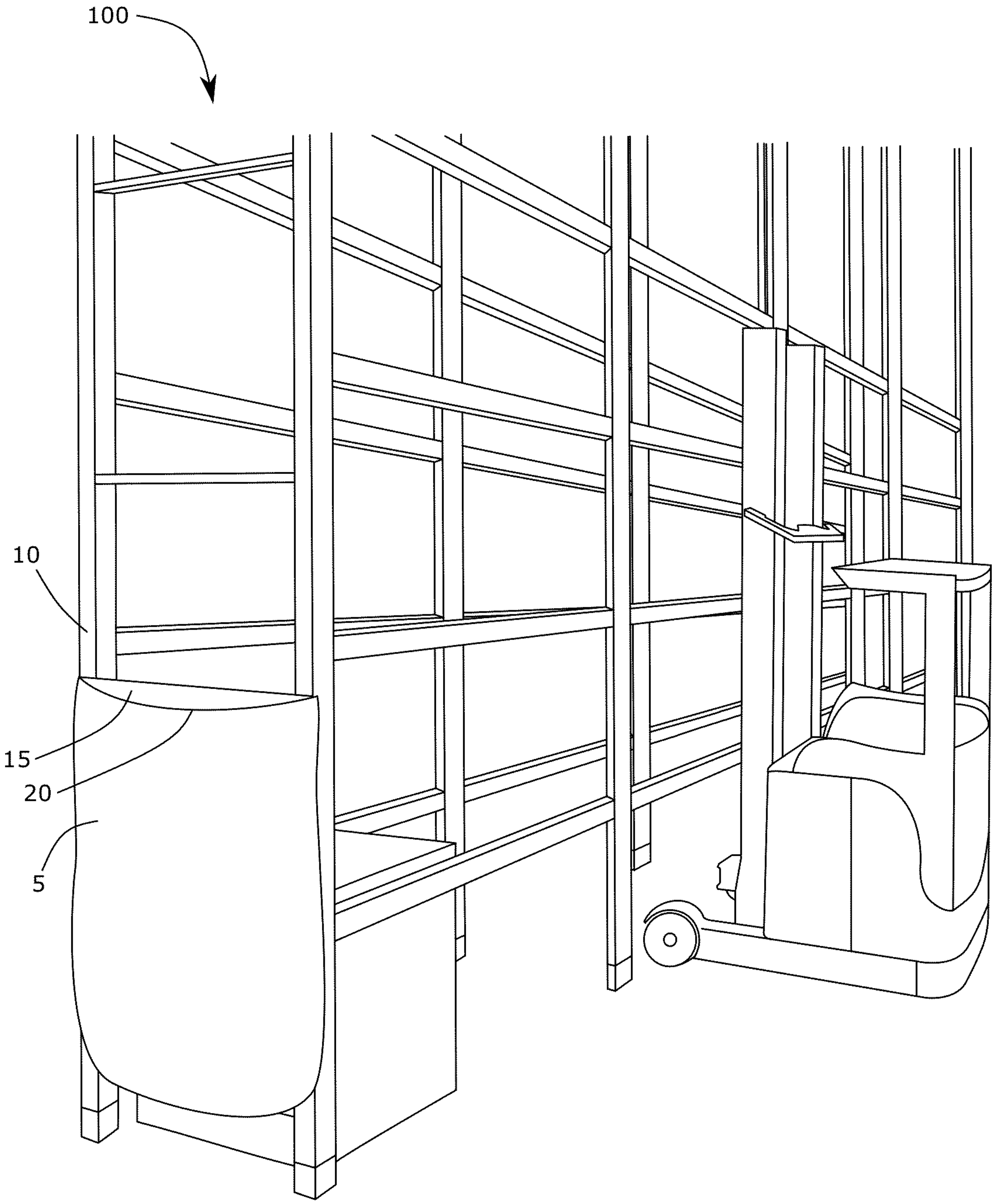
FIG. 1 is a perspective view of an apparatus during an 'in-use' condition whereby the apparatus is supporting a bag in an open-position on a support-surface, according to an embodiment of the disclosure.

The apparatus 100 may be used for supporting a bag 5 in an open-position on a support-surface 10 (the open-position of the bag 5 including an open-mouth 15 and a rim 20 bordering the open-mouth 15). Preferably, the bag 5 may include a heavy-duty load capacity. As shown in FIG. 1, in some embodiments, the apparatus 100 may be used for supporting trash bags in warehouse settings. In this embodiment, again as shown in FIG. 1, the support-surface 10 may be a steel storage rack used in a warehouse. However, it is contemplated that the apparatus 100 may be mounted to, and removed from, any surface.

Figure 2:
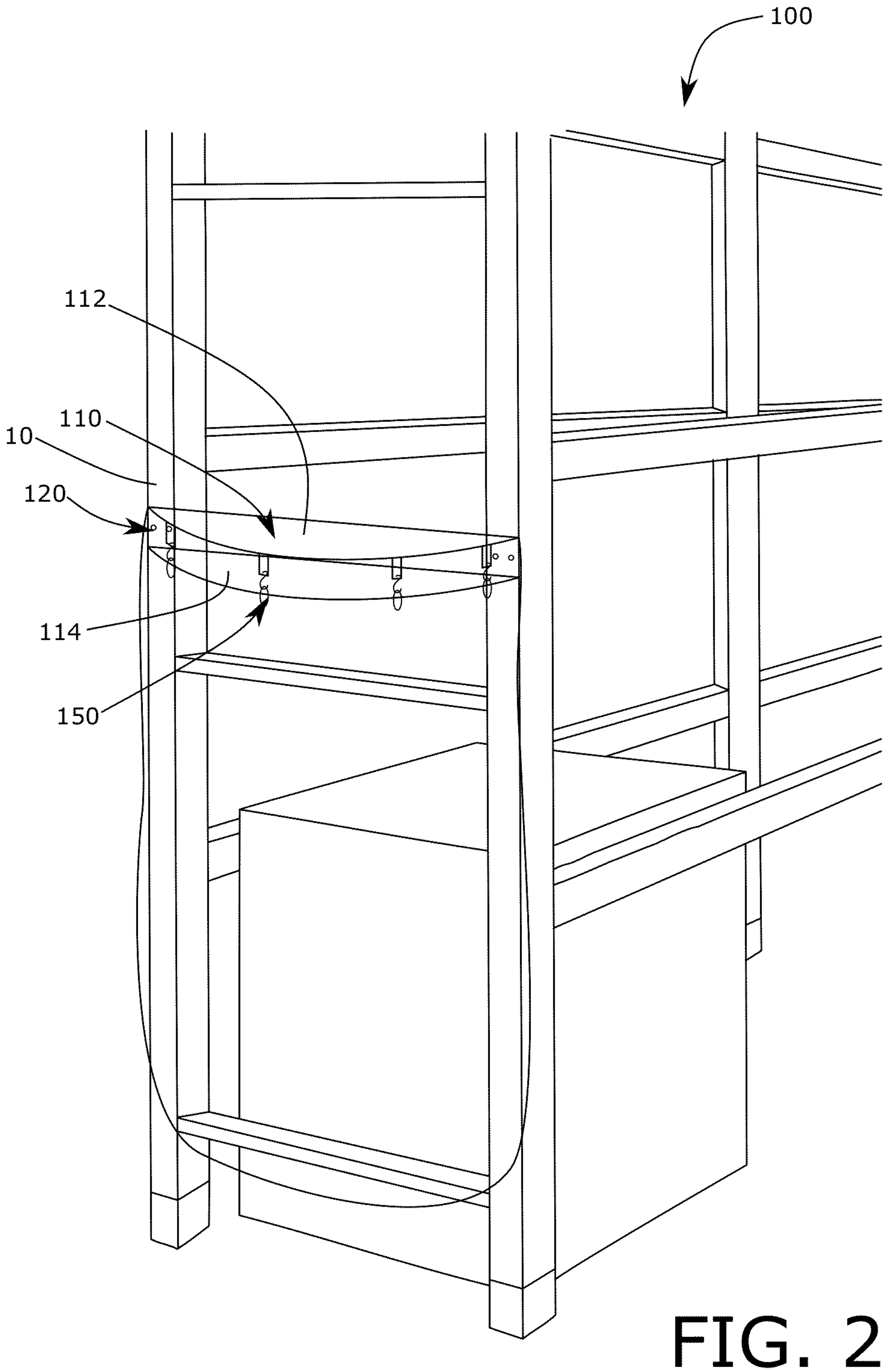
FIG. 2 is a close-up perspective view of the apparatus according to an embodiment of the present disclosure.

As shown in FIG. 2, the apparatus 100 may include a support-frame 110 and at least one fastener 120. The support-frame 110 may comprise an at least substantially shatter-resistant material. Preferably, the shatter-resistant material may also be substantially flexible. In some embodiments, the at least substantially shatter-resistant material may be polycarbonate material. The shatter-resistant material may be particularly useful in industrial and warehouse settings. For example, the support-frame 110 may be configured to withstand being hit repeatedly by flying debris, so that a warehouse worker may be able to throw debris and garbage from a forklift truck into the bag 5.

The support-frame 110 may include a rear-side 112 and a front-side 114 relative to the support-surface 10 and the rear-side 112 may be configured for attachment to the support-surface 10. The at least one fastener 120 may be configured to removably mount the rear-side 112 of the support-frame 110 to the support-surface 10. The support-frame 110 may include a substantially semi-circular profile being defined by an arced-section 115 and a horizontal-section 113. The horizontal-section 113 may define the rear-side 112 of the support-frame 110 and the arced-section 115 may define the front-side 114 of the support-frame 110.

Figure 3:
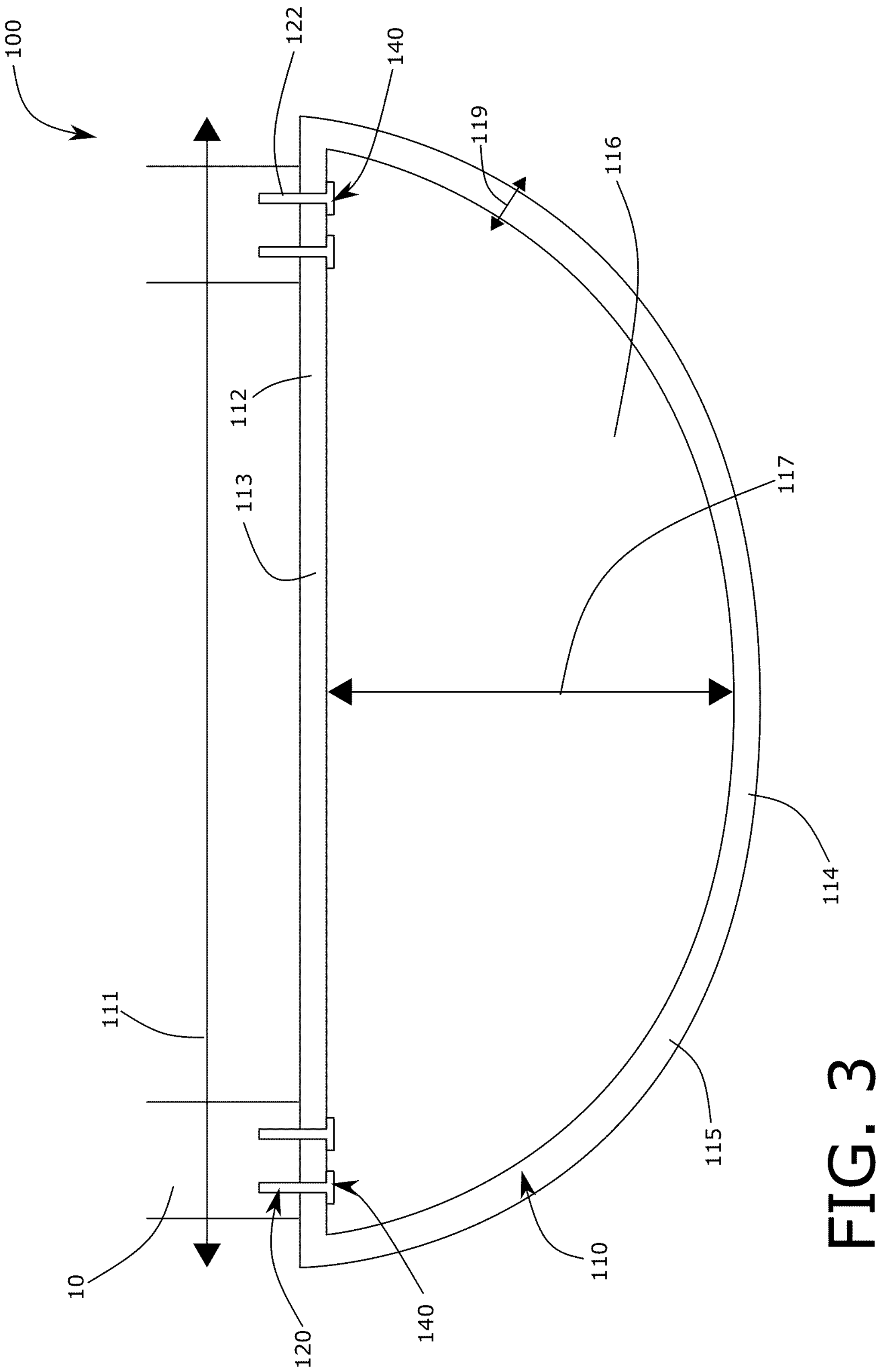
FIG. 3 is a top view of the apparatus of FIG. 1 illustrating a support-frame and at least one fastener, according to an embodiment of the present disclosure.
Figure 4:
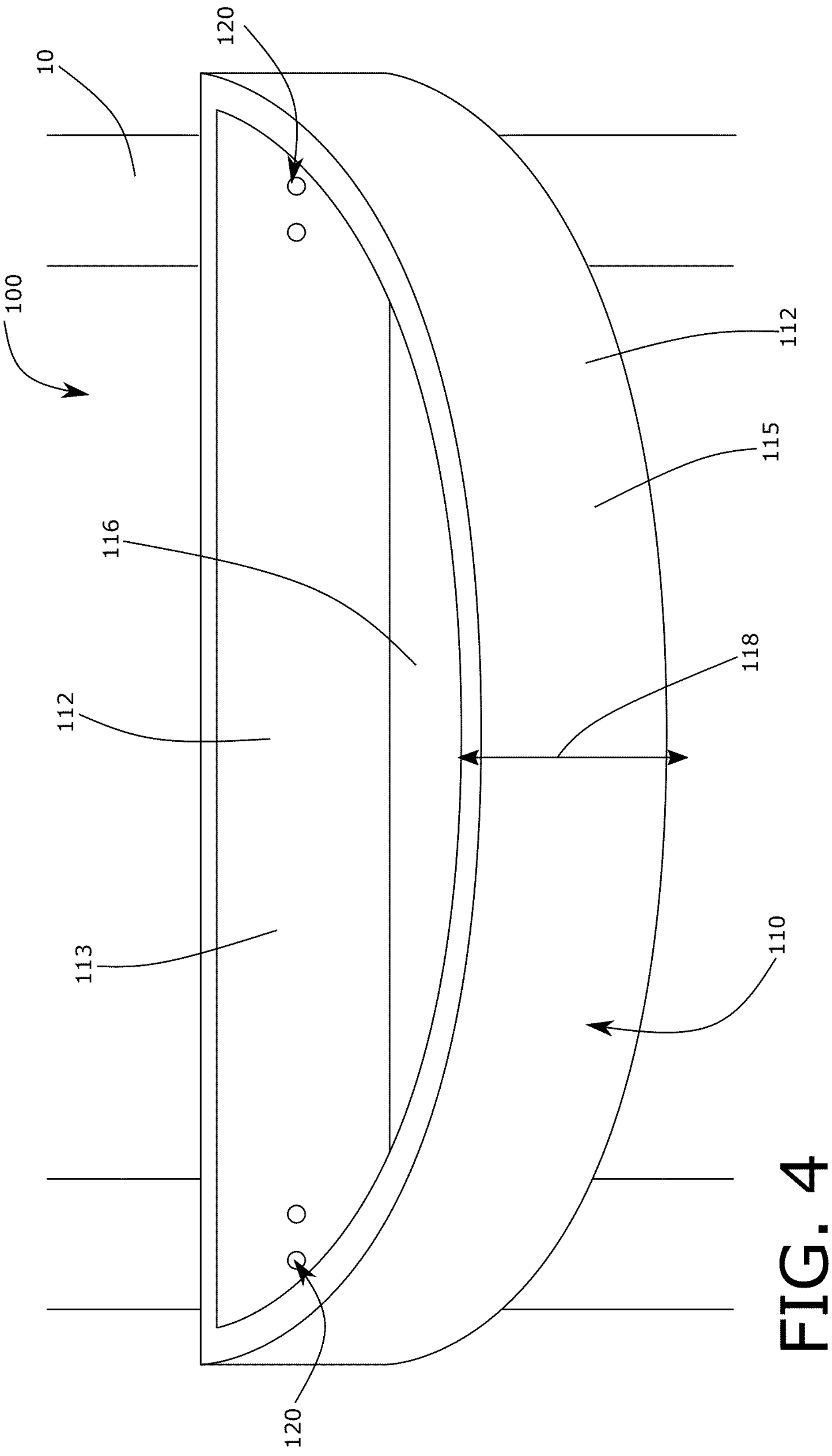
FIG. 4 is a front perspective view of the apparatus of FIG. 3, according to an embodiment of the present disclosure.
Figure 5A:
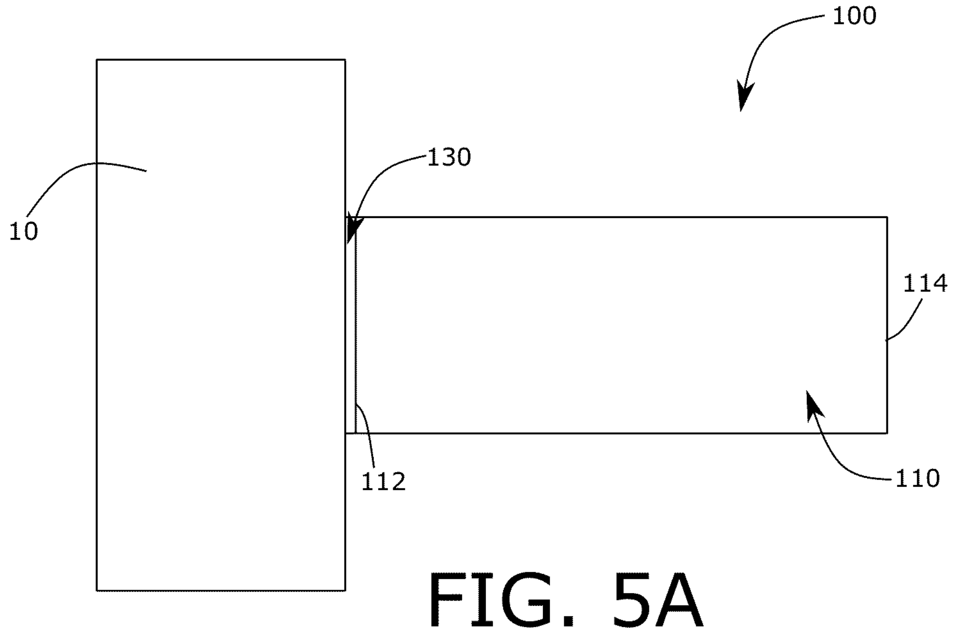
FIG. 5A is a side view of the apparatus of FIG. 3, according to an embodiment of the present disclosure.
Figure 5B:
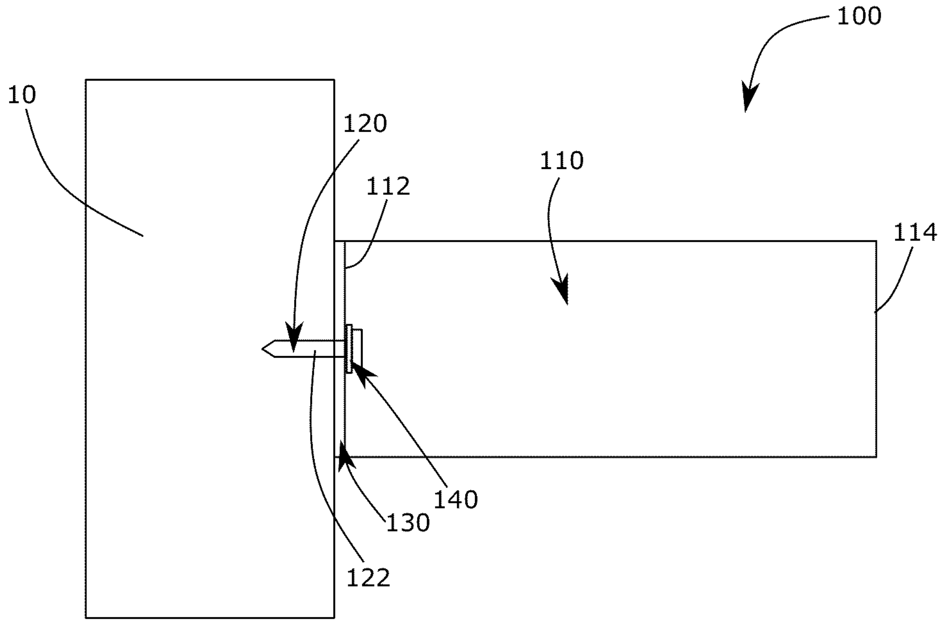
FIG. 5B is a side view of the apparatus of FIG. 5A, the support-frame being partially cut-away to illustrate the at least one fastener, according to an embodiment of the present disclosure.

As shown in FIG. 3, the support-frame 110 may include a frame-thickness 119 of between $\frac{1}{16}$-$\frac{1}{2}$ of an inch. For example, the frame-thickness 119 may be $\frac{3}{16}$ of an inch. Further, as shown in FIG. 4, the support-frame 110 may include a frame-height 118 of between 2-5 inches. For example, in some embodiments, the frame-height 118 may be 3 inches. However, it should be appreciated that these measurements are given as examples and that the apparatus 100 is not limited to the exemplary measurements.

The support-frame 110 may be defined by an opening 116 (the horizontal-section 113 and the arced-section 115 framing the opening 116). As shown in FIG. 1, the opening 116 may be configured to receive the bag 5 therethrough and the support-frame 110 may be configured to support the rim 20 of the bag 5 when the bag 5 is inserted therethrough and hold the bag 5 in the open-position. To achieve this, the opening 116 may include an opening-depth 117 (FIG. 3) sized similar to an open-mouth depth of the open-mouth 15 of the bag 5 when in the open-position, so as to hold the bag 5 sufficiently open for easy insertion of garbage and other debris. In some embodiments, the opening-depth 117 may be between 15-20 inches. For example, the opening-depth 117 may be 16 inches. Again, it should be appreciated that these measurements are given as examples and that the apparatus 100 is not limited to the exemplary measurements.

In some embodiments, the apparatus 100 may comprise at least one clip 150, as shown in FIGS. 1-2. The at least one clip 150 may be configured to secure the rim 20 of the bag 5 to the support-frame 110. The at least one clip 150 may include a string of material attached thereto. Other clip means are also contemplated. Further, in some embodiments, the at least one clip 150 may include a set of clips. For example, as shown, the at least one clip 150 may include four clips.

The support-frame 110 and the at least one fastener 120 may preferably be structured and arranged such that the apparatus 100 is able to support the bag 5 at its maximum load capacity. For example, in some embodiments, the maximum load capacity may be at least 100 lb (or less). In some embodiments, the maximum load capacity may be more than 100 lb. Further, the apparatus 100 may additionally comprise a frame-backing 130 configured to provide additional support to the support-frame 110.

Figure 6:
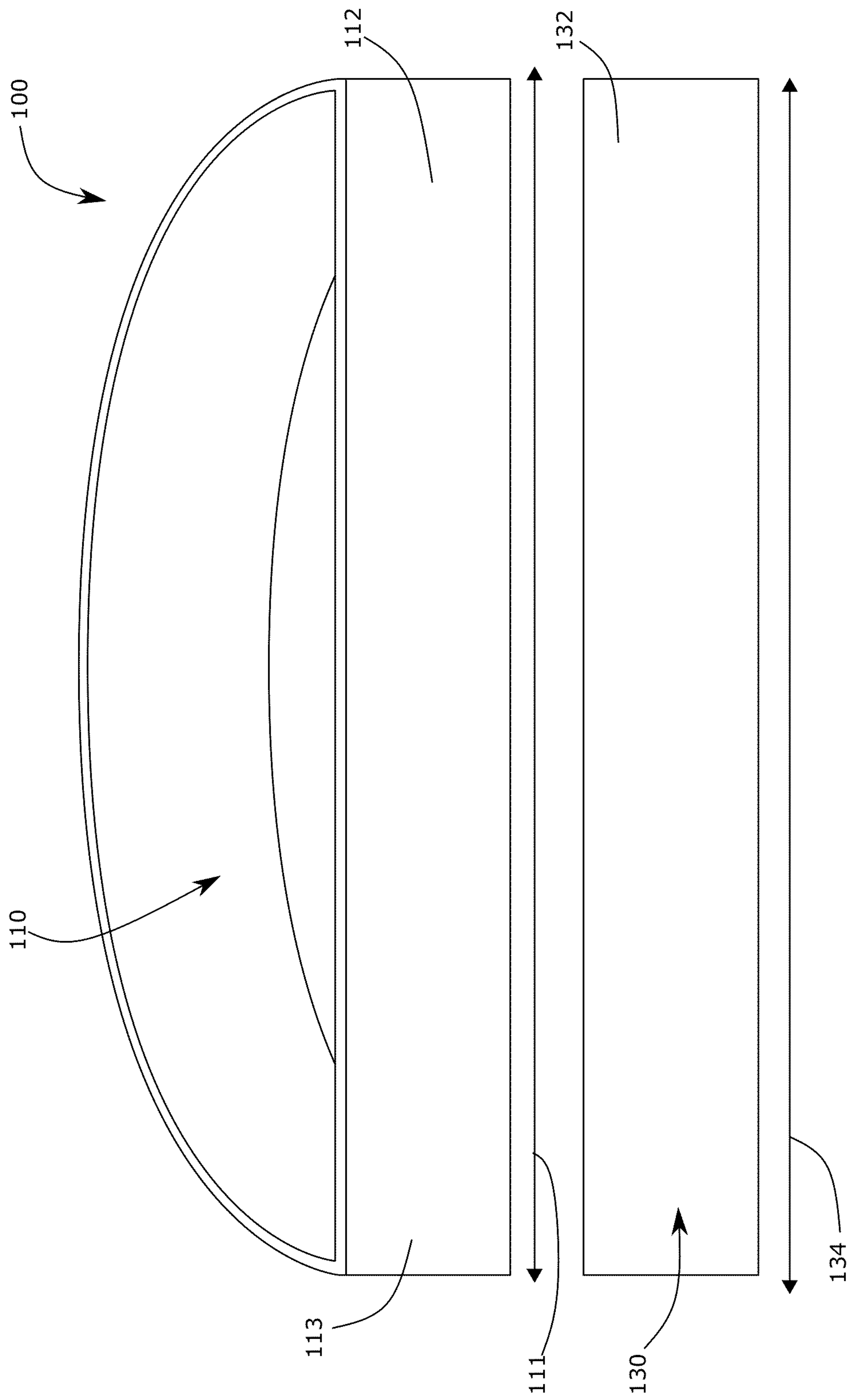
FIG. 6 is a rear perspective view of the apparatus illustrating a rear-side of the support-frame and a frame-backing, according to an embodiment of the present disclosure.
Figure 9:
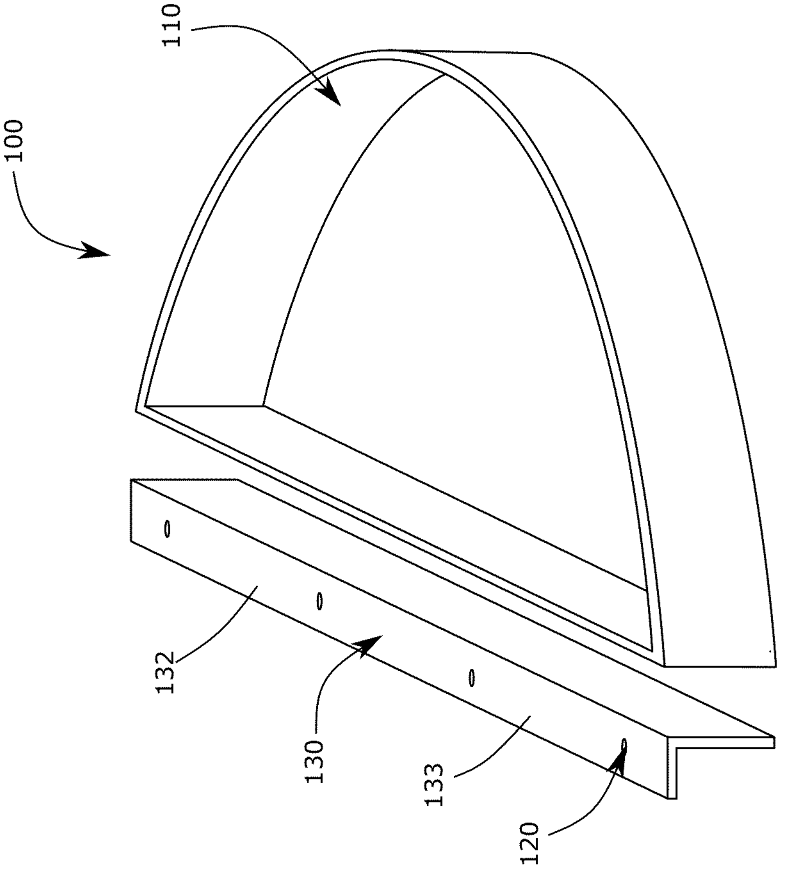
FIG. 9 is a top side perspective view of the apparatus of FIG. 8, illustrating the frame-backing relative to the support-frame, according to another embodiment of the present disclosure.
Figure 11:
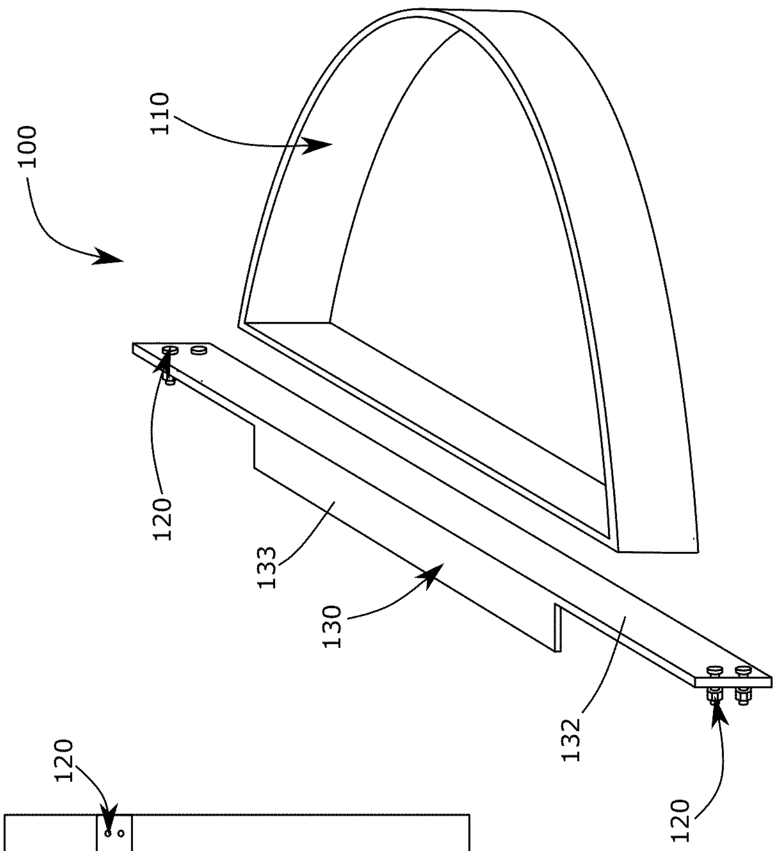
FIG. 11 is a top side perspective view of the apparatus of FIG. 10, illustrating the frame-backing relative to the support-frame, according to another embodiment of the present disclosure.
Figure 10:
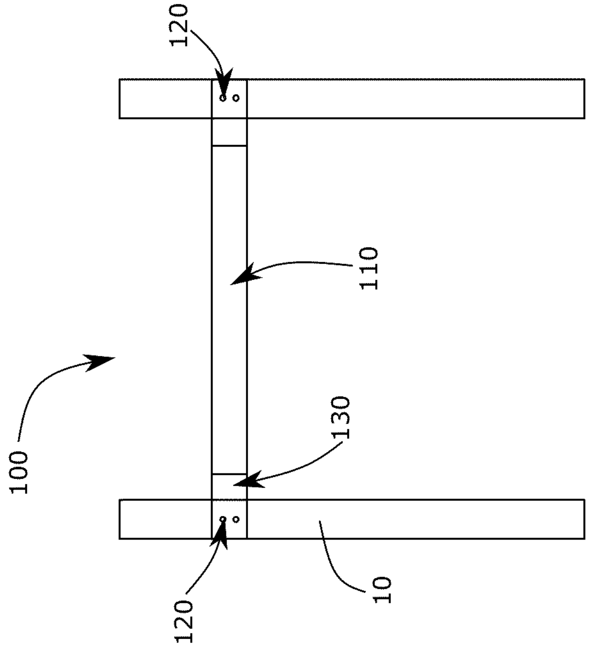
FIG. 10 is a front view of the apparatus illustrating the frame-backing being attached to the support-frame, according to another embodiment of the present disclosure.

Preferably, the frame-backing 130 may be attached to the horizontal-section 113. As shown in FIG. 6, the frame-backing 130 may include a plate-body 132 having a plate-length 134. In some embodiments, as shown in FIGS. 1-9, the plate-length 134 may span the horizontal-section 113. In some embodiments, the horizontal-section 113 may include a horizontal-length 111 between 30-40 inches. For example, in some embodiments, the horizontal-length 111 may be 32 inches. The plate-length 134 may also be between 30-40 inches. In other embodiments, as shown in FIGS. 10-11, the plate-length 134 may be longer than the horizontal-section 113. In some embodiments, the plate-body 132 may include a plate-thickness 136 (FIG. 7) of 0.080 mil. Again, as above, it should be appreciated that measurements are given as examples and that the apparatus 100 is not limited to the exemplary measurements. Further, the frame-backing 130 may comprise a substantially metal material, such as an aluminum material, to aid the support-frame 110 in supporting the maximum load capacity of the bag 5.

Figure 8:
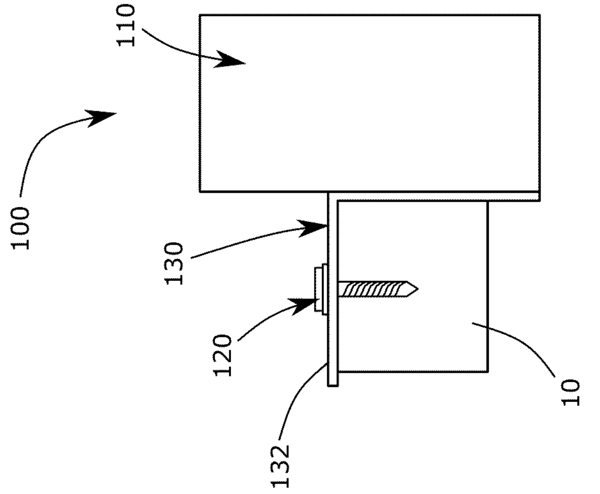
FIG. 8 is a side view of the apparatus illustrating the frame-backing being attached to the support-frame, according to another embodiment of the present disclosure.

In some embodiments, as shown in FIGS. 1-5, the frame-backing 130 may only include the plate-body 132 being flat. In other embodiments, as shown in FIGS. 8-9, the frame-backing 130 may include the plate-body 132 having a L-shaped bracket configuration 133 (defined by a flat-section and a lip-section). In one version of this embodiment, a rear of the plate-body 132 may be configured for attachment to the support-surface 10 and attached thereto with the at least one fastener 120. Further, as shown in FIG. 11, the plate-body 132 may include a partially L-shaped bracket configuration 133, wherein the plate-body 132 includes the flat-section and a portion of the lip-section. In this version of the embodiment, the at least one fastener 120 may attach to the flat-section of the plate-body 132.

The at least one fastener 120 may include at least one self-drilling screw 122. In this embodiment, the apparatus 100 may further comprise at least one washer 140 configured to mate with the at least one self-drilling screw 122. In some embodiments, the at least one self-drilling screw 122 may include a set of self-drilling screws. For example, the set of self-drilling screws may include four self-drilling screws. In addition, the at least one washer 140 may include a set of washers. For example, the set of washers may include four washers, each configured to mate with a self-drilling screw 122.

Figure 7:
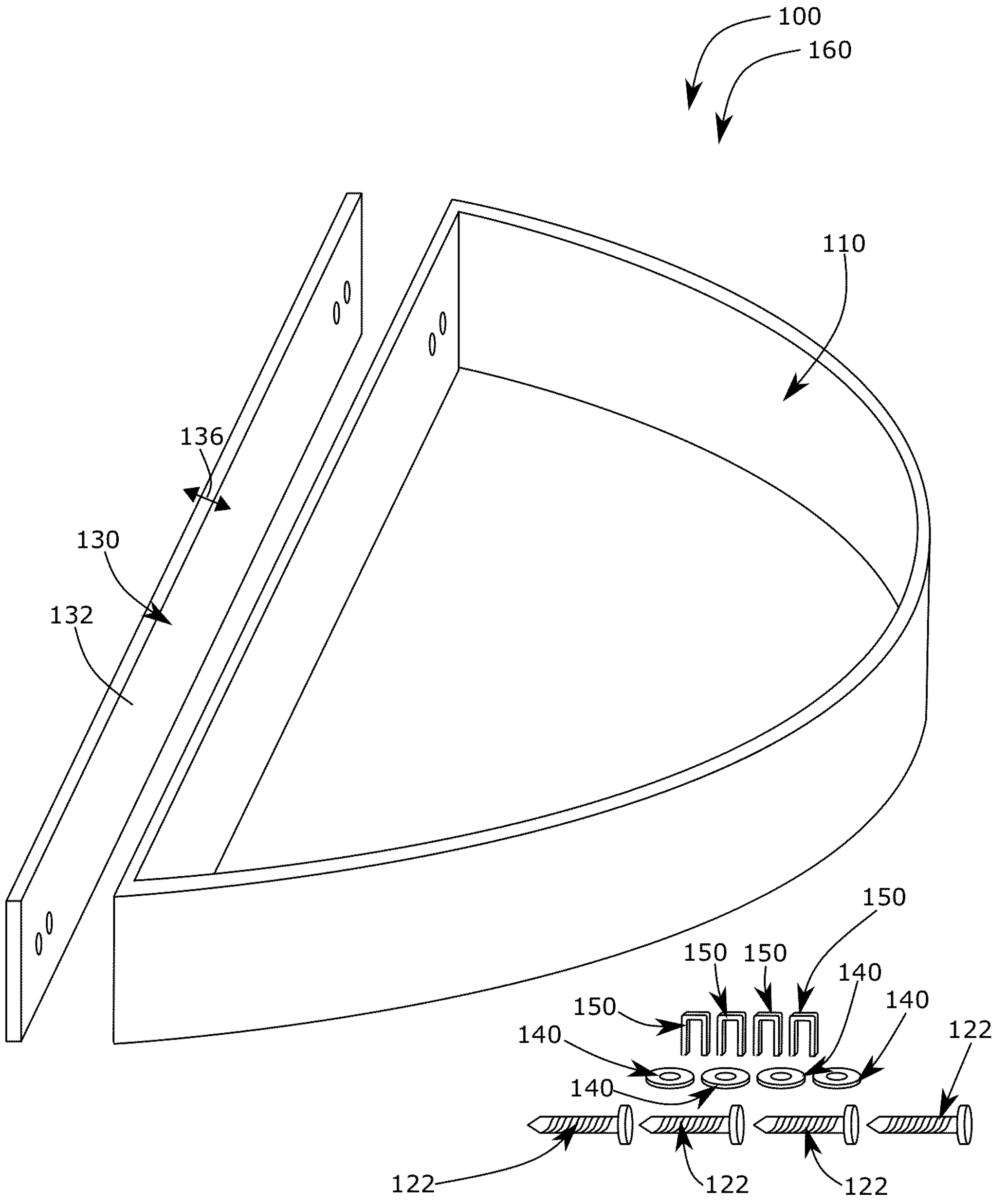
FIG. 7 is a top-side perspective view of the apparatus being provided as a kit and including the support-frame, the frame-backing, four self-drilling screws, four washers, and four clips, according to an embodiment of the present disclosure.

As above, the support-frame 110 and the at least one fastener 120 may preferably be structured and arranged such that the apparatus 100 is able to support the bag 5 at its maximum load capacity. In a preferred embodiment, the support-frame 110, the frame-backing 130, the at least one self-drilling screw 122 and the at least one washer 140 may be structured and arranged such that the apparatus 100 is able to support the bag 5 at its maximum load capacity. In some embodiments, as shown in FIG. 7, the apparatus 100 may be provided as a kit 160. The kit 160 may include the support-frame 110, the frame-backing 130, the at least one self-drilling screw 122, the at least one washer 140 and the at least one clip 150. It should be appreciated that the at least one fastener 120 is not limited to a self-drilling screw 122.

Figure 12:
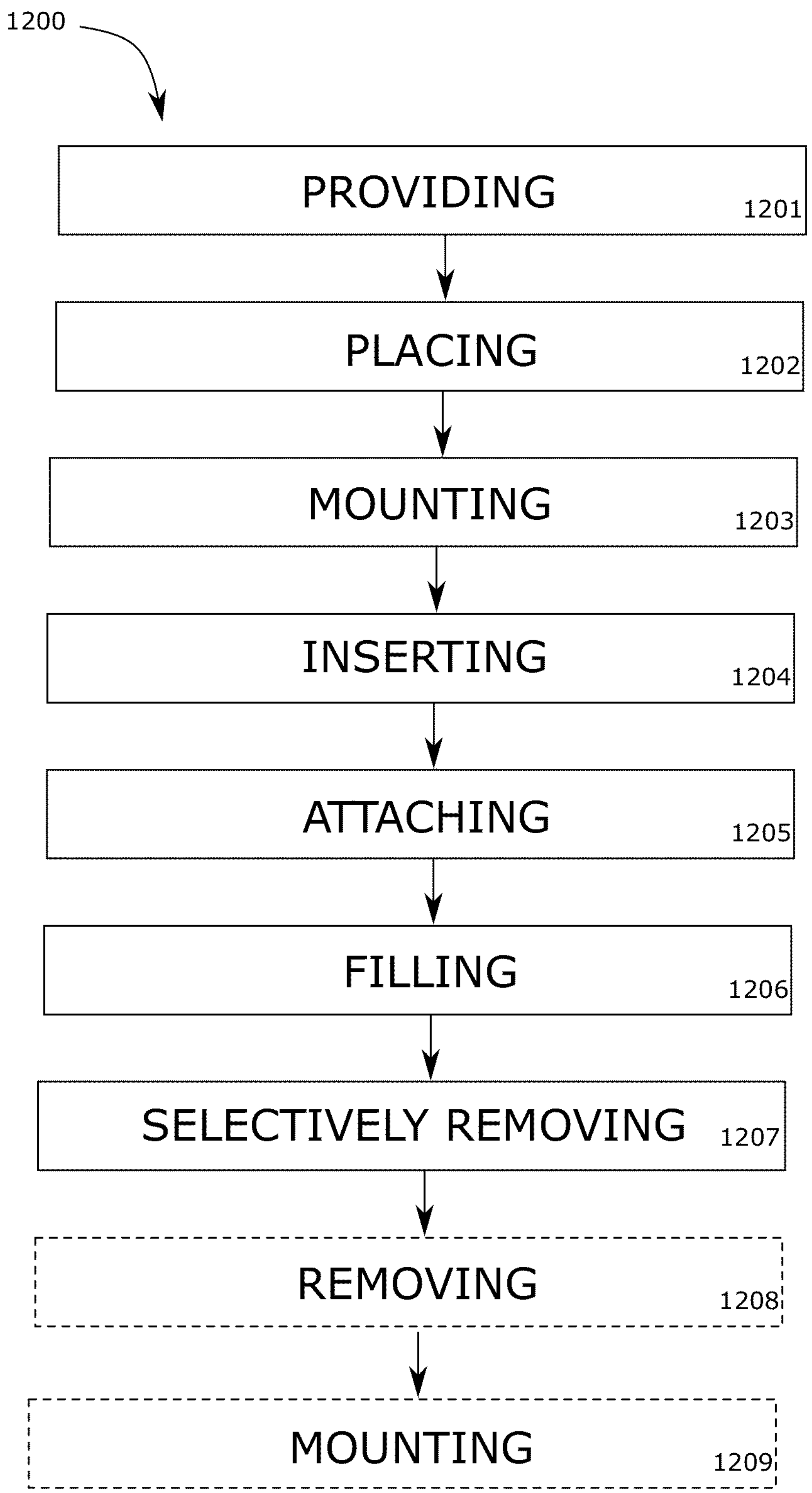
FIG. 12 is a flow diagram illustrating a method of use for using an apparatus for supporting a bag in an open-position on a support-surface, according to an embodiment of the present disclosure.
Figure 13:
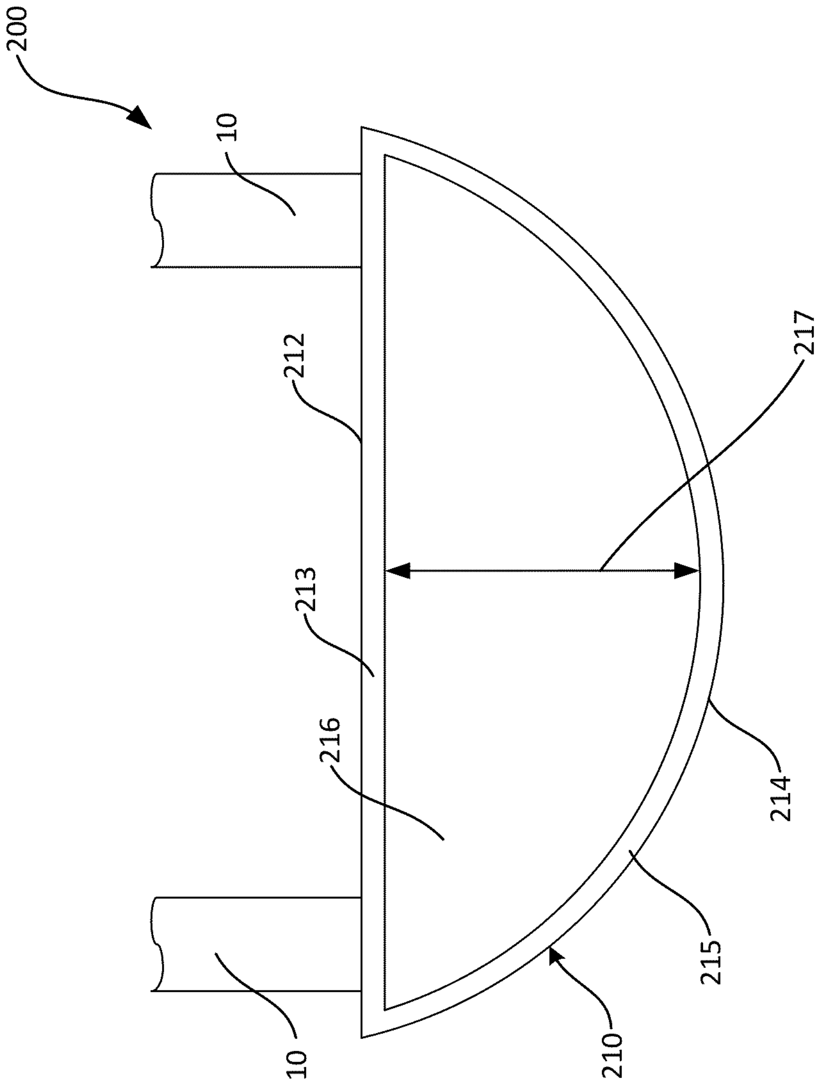
FIG. 13 is a top view of an additional embodiment of the support-frame and at least one fastener of the present disclosure.
Figure 14:
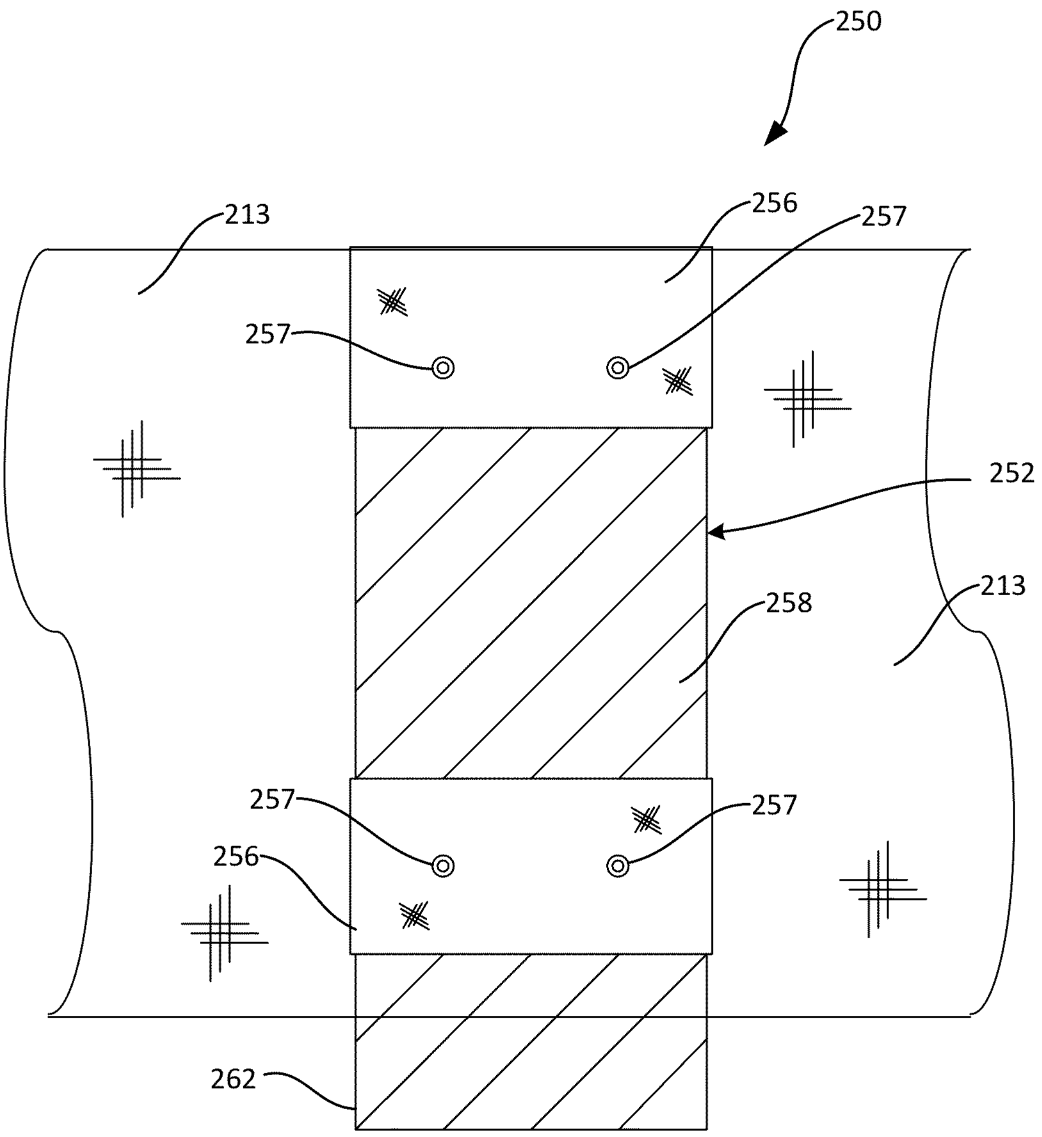
FIG. 14 is a front view of the apparatus with a bag-fastener according to another embodiment of the present disclosure.
Figure 15:
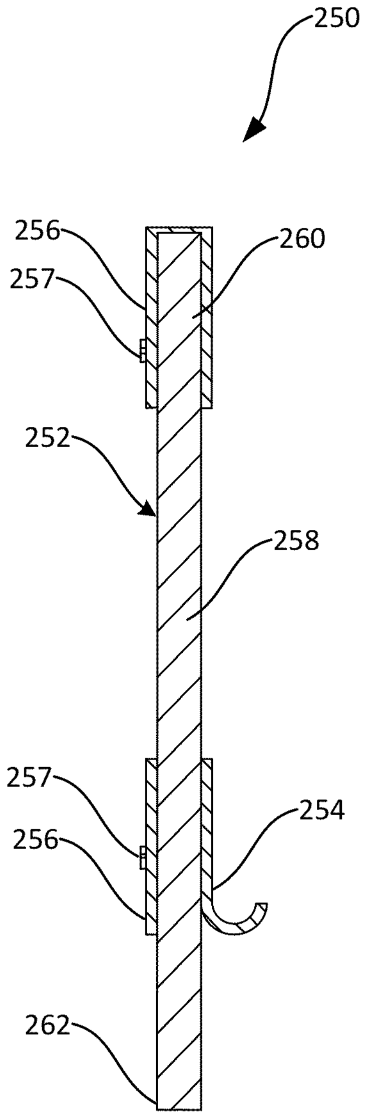
FIG. 15 is a cut-away side view of a bag-fastener according to another embodiment of the present disclosure.
Figure 16:
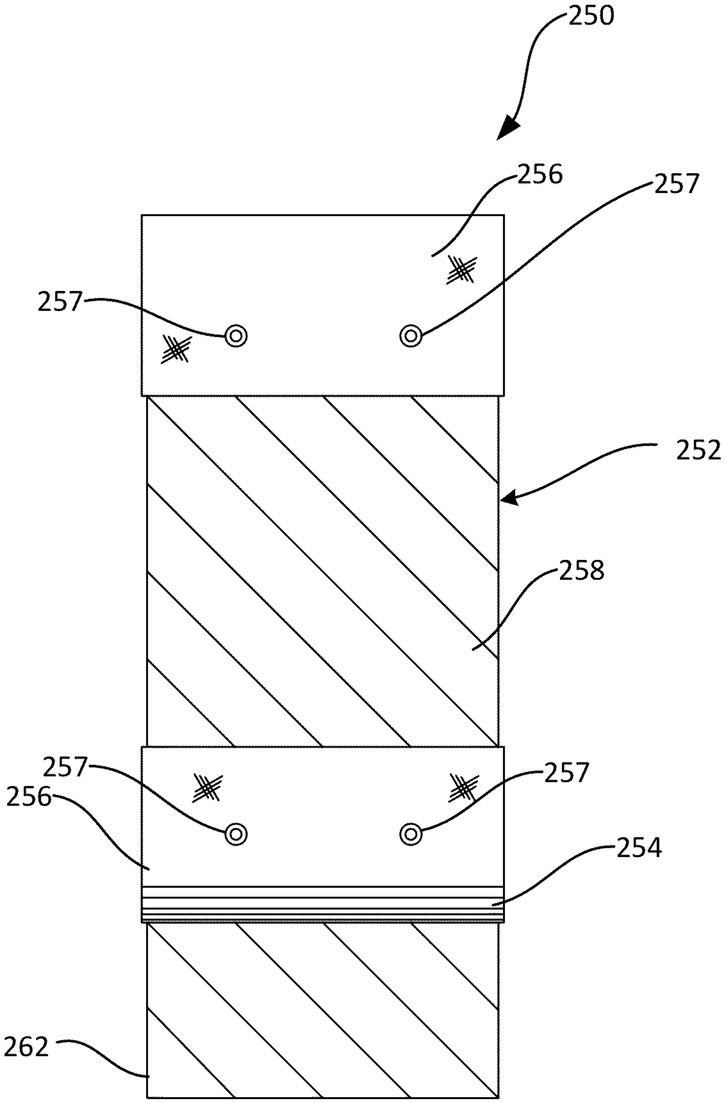
FIG. 16 is a front view of a bag-fastener according to another embodiment of the present disclosure.
Figure 17:
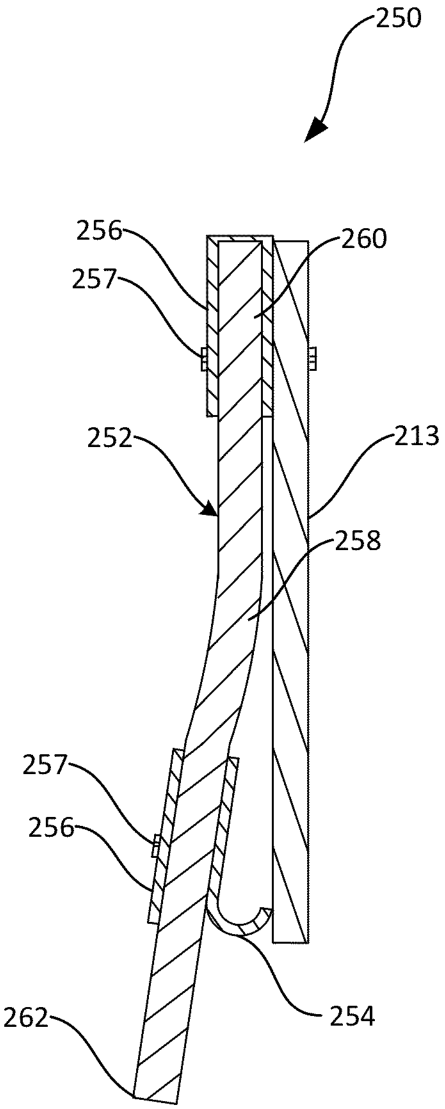
FIG. 17 is a cut-away side view the apparatus illustrating a bag-fastener according to another embodiment of the present disclosure.
Figure 18:
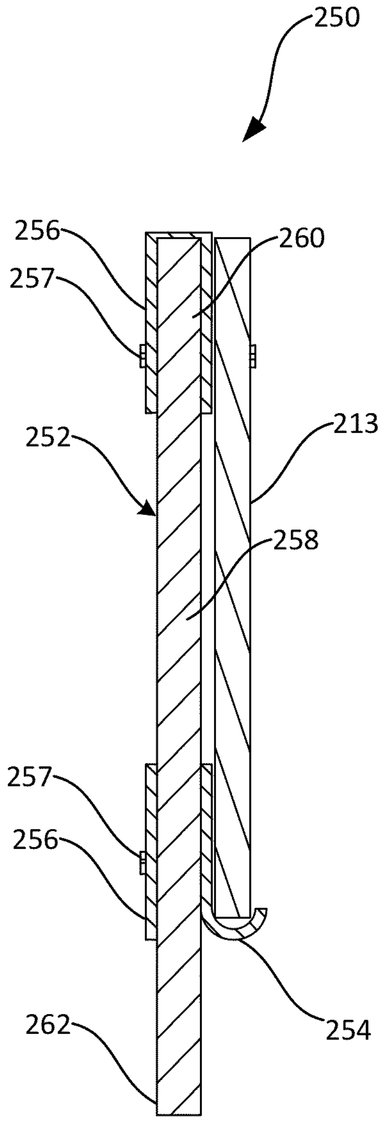
FIG. 18 is a cut-away side view the apparatus illustrating a bag-fastener according to another embodiment of the present disclosure.
Figure 19:
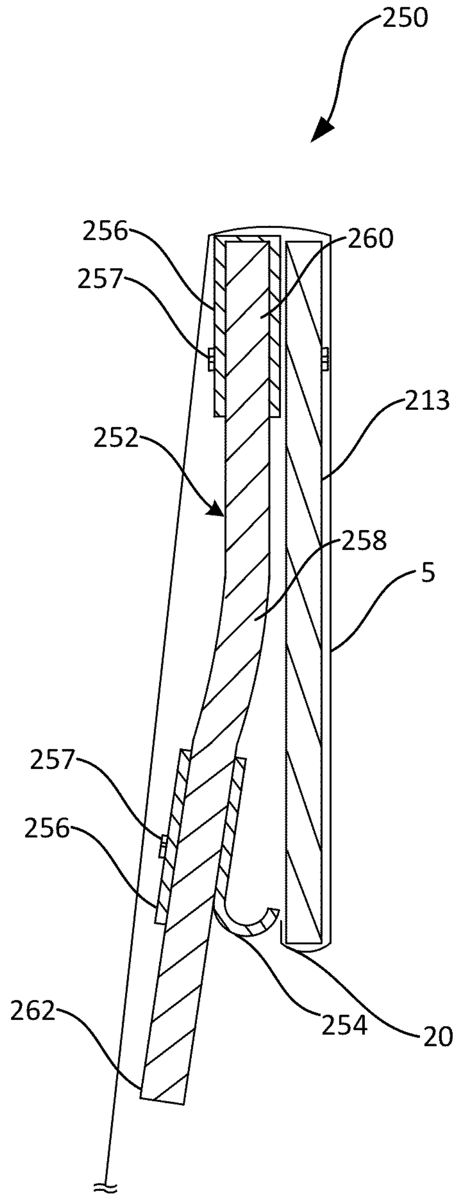
FIG. 19 is a cut-away side view the apparatus illustrating a bag-fastener according to another embodiment of the present disclosure.
Figure 20:
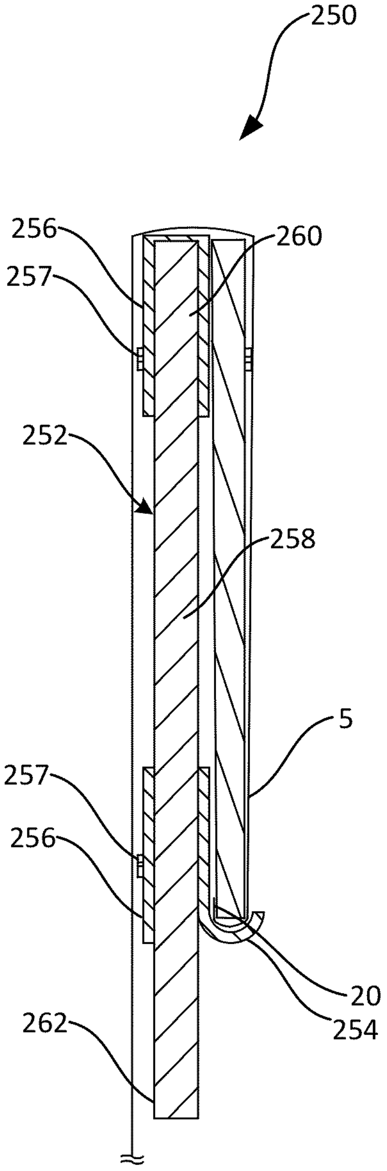
FIG. 20 is a cut-away side view the apparatus illustrating a bag-fastener according to another embodiment of the present disclosure.

Referring now to FIG. 12 showing a flow diagram illustrating a method of use 1200 for supporting a bag in an open-position on a support-surface, according to an embodiment of the present disclosure. In particular, the method of use 1200 may include one or more components or features of the apparatus 100 as described above. As illustrated, the method of use 1200 may include the steps of: step one 1201, providing the apparatus as above; step two 1202, placing the rear-side of the support-frame against the support-surface; step three 1203, mounting the support-frame to the support-surface via the at least one fastener; step four 1204, inserting the bag through the opening of the support-frame; step five 1205, attaching the rim of the bag to the support-frame such that the support-frame holds the bag in the open-position; step six 1206, filling the load capacity of the bag; and step seven 1207, selectively removing the bag from the support-frame when needed (for example, when the bag is full).

In some embodiments, further steps may include step eight 1208, removing the support-frame from the support-surface; and step nine 1209, mounting the support-frame to another support-surface. For example, if a worker needs to dispose of garbage in a different location, they may remove the support-frame from the current location and attach it to another support-surface at a different location.

It should be noted that step eight 1208 and step nine 1209 are optional steps and may not be implemented in all cases. Optional steps of method of use 1200 are illustrated using dotted lines in FIG. 12 so as to distinguish them from the other steps of method of use 1200. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using the apparatus to support a bag in an open-position on a support-surface are taught herein.

Referring now to FIGS. 13-20, there is shown additional embodiments of an apparatus 200.

The apparatus 200 may be used for supporting a bag 5 in an open-position on a support-surface 10 (the open-position of the bag 5 including an open-mouth 15 and a rim 20 bordering the open-mouth 15), see FIG. 1. Preferably, the bag 5 may include a heavy-duty load capacity. In some embodiments, the apparatus 200 may be used for supporting trash bags in warehouse settings.

The apparatus 200 includes a support-frame 210 may include a rear-side 212 and a front-side 214 relative to the support-surface 10 and the rear-side 212 may be configured for attachment to the support-surface 10. The support-frame 210 may include a substantially semi-circular profile being defined by an arced-section 215 and a horizontal-section 213. The horizontal-section 213 may define the rear-side 212 of the support-frame 210 and the arced-section 215 may define the front-side 214 of the support-frame 210.

The support-frame 210 may be defined by an opening 216 (the horizontal-section 213 and the arced-section 215 framing the opening 216). The opening 216 may be configured to receive the bag 5 therethrough and the support-frame 210 may be configured to support the rim 20 of the bag 5 when the bag 5 is inserted therethrough and hold the bag 5 in the open-position. To achieve this, the opening 216 may include an opening-depth 217 sized similar to an open-mouth depth of the open-mouth 15 of the bag 5 when in the open-position, so as to hold the bag 5 sufficiently open for easy insertion of garbage and other debris. In some embodiments, the opening-depth 217 may be between 15-20 inches. For example, the opening-depth 217 may be 16 inches. Again, it should be appreciated that these measurements are given as examples and that the apparatus 200 is not limited to the exemplary measurements.

In some embodiments, the apparatus 200 may comprise at least one bag fastener 250. The at least one bag fastener 250 may be configured to secure the rim 20 of the bag 5 to the support-frame 210. The at least one bag fastener 250 may include an elastic strap 252 having a strap body 258, an upper end 260, a lower end 262. Elastic strap may be constructed from rubber or other flexible, stretchable material. Upper end 260 of elastic strap 252 is secured to the interior wall of horizontal-section 213, as illustrated, and/or the arced-section 215. As illustrated, a plurality of bag fasteners 250 are positioned around various locations along the interior wall of horizontal-section 213 and/or the arced-section 215.

Bag fastener 250 also includes a hook shaped clip 254. Clip 254 is secured to the strap body 258 between the strap body 258 and the support-frame 210 and located proximate to the lower end 262 but sufficiently away from the lower end 262 to allow a user to grip the strap body 258 between the clip 254 and the lower end 262. In some embodiments, as shown, at least one reinforcement support 256 is included to provide additional support to the bag fastener 250. Other fasteners are also contemplated. Further, in some embodiments, the at least one bag fastener 250 may include a plurality of bag fasteners. For example, as shown, the at least one bag fastener 250 may include four fasteners.

Figure 21:
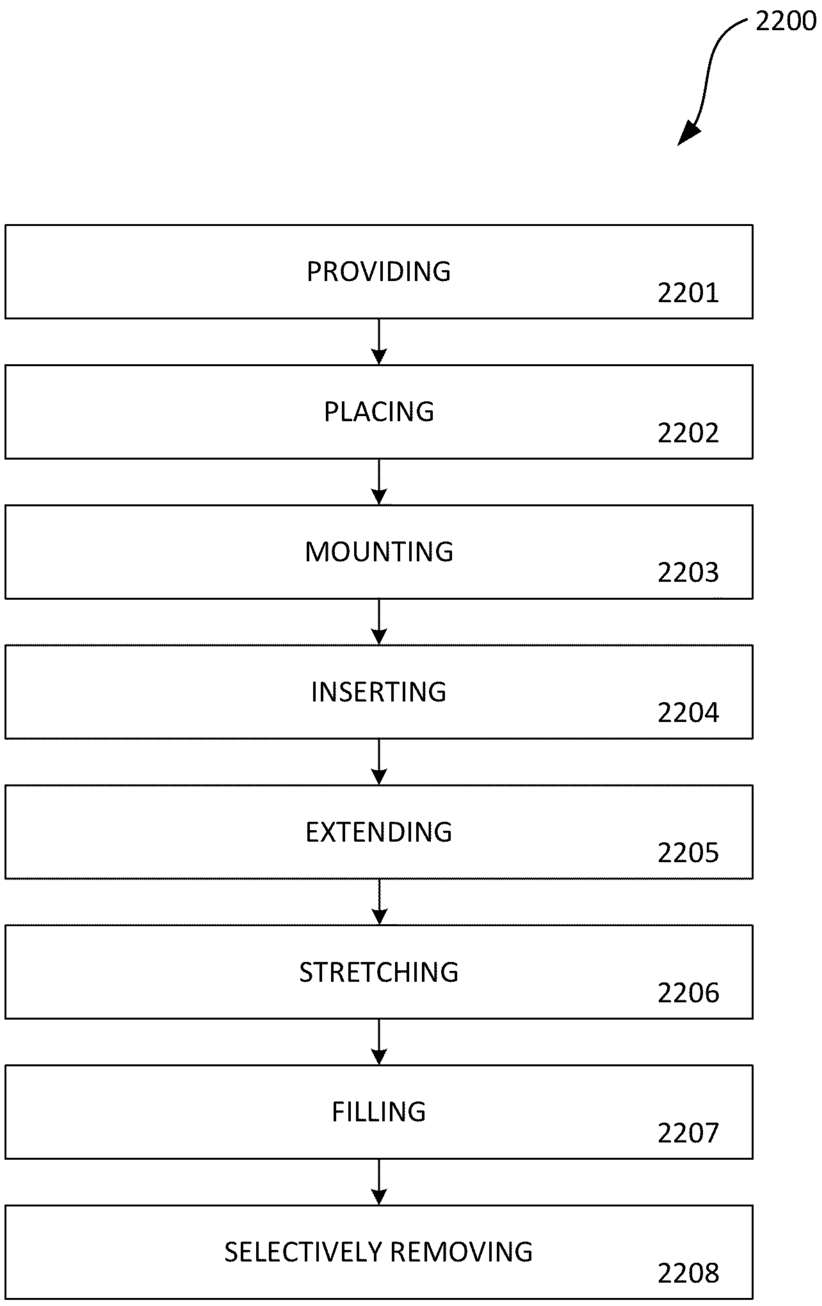
FIG. 21 is a flow diagram illustrating a method of use for using an apparatus for supporting a bag in an open-position on a support-surface, according to an additional embodiment of the present disclosure.

Referring now to FIG. 21 showing a flow diagram illustrating a method of use 2200 for supporting a bag in an open-position on a support-surface, according to an embodiment of the present disclosure. In particular, the method of use 2200 may include one or more components or features of the apparatus 200 as described above. As illustrated, the method of use 2200 may include the steps of: step one 2201, providing the apparatus as above; step two 2202, placing the rear-side of the support-frame against the support-surface; step three 2203, mounting the support-frame to the support-surface; step four 2204, inserting the bag through the opening of the support-frame; step five 2205, extending the bag over the bag fasteners and around the outer surface of the support-frame; step six 2206, stretching the elastic strap 252 sufficiently so that clip 254 engages with the lower edge of the support frame 210 and thereby attaching the rim of the bag to the support-frame such that the support-frame holds the bag in the open-position; step seven 1207, filling the load capacity of the bag; and step eight 1208, selectively removing the bag from the support-frame when needed (for example, when the bag is full).

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed:

1. An apparatus for supporting a bag in an open-position on a support-surface, the bag having a heavy-duty load capacity, the open-position including the bag having an open-mouth and a rim bordering the open-mouth, the apparatus comprising:

a support-frame, the support-frame constructed from an at least substantially shatter-resistant material, the support-frame includes a substantially semi-circular profile being defined by an arced-section and a horizontal-section, wherein the horizontal-section defines a rear-side of the support-frame and has a horizontal-length, and wherein the arced-section defines a front-side of the support frame, the support-frame further defining an opening, the opening configured to receive the bag therethrough, the support-frame being configured to support the rim of the bag when the bag is inserted therethrough and hold the bag in the open-position;

at least one fastener, the at least one fastener configured to removably mount the rear-side of the support-frame to the support-surface; and a plurality of bag fasteners, each of the plurality of bag fasteners extending along a vertical length of the support-frame and spaced at variable distances from the other plurality of bag fasteners along the arced-section and horizontal-section of the support frame, each of the plurality of bag fasteners having an elastic strap having a strap body, an upper end and a lower end, the upper end being secured to the interior wall of horizontal-section and the arced-section, each of the plurality of bag fasteners being configured to secure the rim of the bag to the arced-section and horizontal-section of the support frame and having a hook shaped clip secured to the strap body for securing the elastic strap to the support frame, the hook shaped clip located sufficiently away from the lower end of the elastic strap to allow a user to grip the strap body between the clip and the lower end of the elastic strap to secure the bag to the support frame via the hook shaped clip, wherein the support-frame and the at least one fastener are structured and arranged such that the apparatus is able to support the bag at maximum load capacity.

2. The apparatus of claim 1, wherein the maximum load capacity is at least 100 lb.

3. The apparatus of claim 1, wherein the support-frame includes a substantially semi-circular profile being defined by an arced-section and a horizontal-section, wherein the horizontal-section defines the rear-side of the support-frame, and wherein the arced-section defines the front-side of the support frame.

4. The apparatus of claim 3, wherein horizontal-section includes a horizontal-length of between 30-40 inches.

5. The apparatus of claim 4, further comprising a frame-backing configured to provide additional support to the support-frame, the frame-backing being attached to the horizontal-section, and wherein the frame-backing includes a plate-body having a plate-length.

6. The apparatus of claim 5, wherein the plate-body further includes a plate-thickness of 0.080 mil.

7. The apparatus of claim 6, wherein the frame-backing comprises an aluminum material.

8. The apparatus of claim 1, wherein the opening includes an opening-depth of between 15-20 inches.

9. The apparatus of claim 8, wherein the support-frame includes a frame-height of between 2-5 inches.

10. The apparatus of claim 9, wherein the support-frame includes a frame-thickness of between 1/16-1/2 inch.

11. The apparatus of claim 1, wherein said at least substantially shatter-resistant material is also substantially flexible.

12. The apparatus of claim 11, wherein said at least substantially shatter-resistant material is polycarbonate material.

13. The apparatus of claim 1, wherein the at least one fastener includes at least one self-drilling screw.

14. The apparatus of claim 13, further comprising at least one washer configured to mate with the at least one self-drilling screw.

15. A method of using an apparatus for supporting a bag in an open-position on a support-surface, the bag having a heavy-duty load capacity, the open-position including the bag having an open-mouth and a rim bordering the open-mouth, the method comprising the steps of:

providing the apparatus, the apparatus including:

a support-frame, the support-frame constructed from an at least substantially shatter-resistant material, the support-frame includes a substantially semi-circular profile being defined by an arced-section and a horizontal-section, wherein the horizontal-section defines a rear-side of the support-frame and has a horizontal-length, and wherein the arced-section defines a front-side of the support frame, the support-frame further defining an opening, the opening configured to receive the bag therethrough, the support-frame being configured to support the rim of the bag when the bag is inserted therethrough and hold the bag in the open-position, at least one fastener, the at least one fastener configured to removably mount the rear-side of the support-frame to the support-surface, and a plurality of bag fasteners, each of the plurality of bag fasteners extending along a vertical length of the support-frame and spaced at variable distances from the other plurality of bag fasteners along the arced-section and horizontal-section of the support frame, each of the plurality of bag fasteners having an elastic strap having a strap body, an upper end and a lower end, the upper end being secured to the interior wall of horizontal-section and the arced-section, each of the plurality of bag fasteners being configured to secure the rim of the bag to the arced-section and horizontal-section of the support frame and having a hook shaped clip secured to the strap body for securing the elastic strap to the support frame, the hook shaped clip located sufficiently away from the lower end of the elastic strap to allow a user to grip the strap body between the clip and the lower end of the elastic strap to secure the bag to the support frame via the hook shaped clip, wherein the support-frame and the at least one fastener are structured and arranged such that the apparatus is able to support the bag at a maximum load capacity, placing the rear-side of the support-frame against the support-surface;

mounting the support-frame to the support-surface via the at least one fastener;

inserting the bag through the opening of the support-frame;

attaching the rim of the bag to the support-frame such that the support-frame holds the bag in the open-position;

filling the load capacity of the bag; and selectively removing the bag from the support-frame when needed.

16. The method of claim 15, further comprising the steps of:

removing the support-frame from the support-surface; and mounting the support-frame to another support-surface.

* * * * *